United States Patent
Akiyama et al.

(10) Patent No.: US 11,434,808 B2
(45) Date of Patent: Sep. 6, 2022

(54) CONTROLLER OF FAN COUPLING DEVICE

(71) Applicant: TOYOTA JIDOSHA KABUSHIKI KAISHA, Toyota (JP)

(72) Inventors: Shoichi Akiyama, Toyota (JP); Noboru Takagi, Toyota (JP); Daichi Yamazaki, Toyota (JP); Masaaki Yamaguchi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/214,174

(22) Filed: Mar. 26, 2021

(65) Prior Publication Data

US 2021/0332738 A1 Oct. 28, 2021

(30) Foreign Application Priority Data

Apr. 28, 2020 (JP) .............................. JP2020-079558

(51) Int. Cl.
  *F01P 5/02* (2006.01)
  *F01P 7/04* (2006.01)
  *F01P 5/04* (2006.01)
  *B60K 11/06* (2006.01)

(52) U.S. Cl.
  CPC .............. *F01P 7/042* (2013.01); *B60K 11/06* (2013.01); *F01P 5/04* (2013.01); *F01P 2025/64* (2013.01); *F01P 2037/00* (2013.01)

(58) Field of Classification Search
  CPC .............. F16D 33/00; F16D 2300/0214; F01P 2037/00; F01P 5/02; F01P 5/04
  See application file for complete search history.

(56) References Cited

U.S. PATENT DOCUMENTS

| 4,550,695 A | * | 11/1985 | Kikuchi | ................. | F01P 7/081 |
|---|---|---|---|---|---|
| | | | | | 192/82 T |
| 2007/0068762 A1 | * | 3/2007 | Bhat | ...................... | F01P 7/042 |
| | | | | | 192/58.61 |
| 2008/0217132 A1 | * | 9/2008 | Sato | ...................... | F16D 35/025 |
| | | | | | 192/58.63 |
| 2016/0097293 A1 | * | 4/2016 | Svihla | ................... | F16J 15/447 |
| | | | | | 277/424 |
| 2018/0298805 A1 | * | 10/2018 | Kinugawa | ................. | F01P 5/04 |
| 2018/0371980 A1 | * | 12/2018 | Minagawa | ............... | F01P 5/04 |

FOREIGN PATENT DOCUMENTS

JP       2019-007429 A       1/2019

\* cited by examiner

*Primary Examiner* — Long T Tran
(74) *Attorney, Agent, or Firm* — Finnegan, Henderson, Farabow, Garrett & Dunner, LLP

(57) ABSTRACT

A controller includes: an acquisition unit that acquires a deviation between an estimated amount and a target amount of a working fluid in the labyrinth chamber, and a fluid amount parameter corresponding to the estimated amount; and a control unit that executes feedback control including at least integral control of the deviation so as to control a regulation mechanism. When the fluid amount parameter is equal to or greater than a threshold, the control unit executes the feedback control in a state where the integral control is stopped.

8 Claims, 9 Drawing Sheets

CONTROLLER OF FAN COUPLING DEVICE

CROSS-REFERENCE TO RELATED APPLICATION

This application claims priority to Japanese Patent Application No. 2020-079558 filed on Apr. 28, 2020, incorporated herein by reference in its entirety.

BACKGROUND

1. Technical Field

The present disclosure relates to a controller of a fan coupling device.

2. Description of Related Art

A fan coupling device executes feedback control of deviation between actual rotation speed and target rotation speed of a fan so as to regulate the amount of working fluid in a labyrinth chamber provided in some part of a working chamber of the fan coupling device. For example, in Japanese Unexamined Patent Application Publication No. 2019-007429 (JP 2019-007429 A), integral control in feedback control is stopped when the deviation is equal to or greater than a threshold.

SUMMARY

In the technology of JP 2019-007429 A, even when the deviation is small, the integral control is not stopped if the amount of the working fluid in the labyrinth chamber is large. In this case, there are possibilities that the responsiveness of the fan may deteriorate, and hunting, steep fall, or the like, of the rotation speed of the fan may occur.

Accordingly, an object of the present embodiment is to provide a controller of a fan coupling device in which deterioration of responsiveness is restrained.

The above object can be accomplished by a controller of a fan coupling device. The fan coupling device includes a drive shaft, a rotor, a housing, a fan, a labyrinth chamber, and a regulation mechanism. The drive shaft is rotationally driven. The rotor is coupled to the drive shaft. The housing is configured to house the rotor, the housing being supported so as to be rotatable relative to the rotor. The fan is fixed to the housing. The labyrinth chamber is formed between the housing and the rotor in the housing and configured to transmit rotational motive power of the rotor to the housing through working fluid. The regulation mechanism is configured to regulate the amount of the working fluid in the labyrinth chamber. The controller includes: an acquisition unit; and a control unit. The acquisition unit is configured to acquire a deviation between an estimated amount and a target amount of the working fluid in the labyrinth chamber, and a fluid amount parameter corresponding to the estimated amount. The control unit is configured to execute feedback control including at least integral control of the deviation so as to control the regulation mechanism. When the fluid amount parameter is equal to or greater than a threshold, the control unit executes the feedback control in a state where the integral control is sopped.

The object can also be accomplished by a controller of a fan coupling device. The fan coupling device includes a drive shaft, a rotor, a housing, a fan, a labyrinth chamber, and a regulation mechanism. The drive shaft is rotationally driven. The rotor is coupled to the drive shaft. The housing is configured to house the rotor, the housing being supported so as to be rotatable relative to the rotor. The fan is fixed to the housing. The labyrinth chamber is formed between the housing and the rotor in the housing and configured to transmit rotational motive power of the rotor to the housing through working fluid. The regulation mechanism is configured to regulate the amount of the working fluid in the labyrinth chamber. The controller includes: an acquisition unit; and a control unit. The acquisition unit is configured to acquire a deviation parameter corresponding to a deviation between an actual rotation speed and a target rotation speed of the fan, and a fluid amount parameter corresponding to the estimated amount of the working fluid in the labyrinth chamber. The control unit is configured to execute feedback control including integral control of the deviation parameter so as to control the regulation mechanism. When the fluid amount parameter is equal to or greater than a threshold, the control unit executes the feedback control in a state where the integral control is stopped.

The control unit may set such that the threshold increases as the rotation speed of the drive shaft increases in a range where the rotation speed of the drive shaft is equal to or less than a prescribed value.

The control unit may set such that the threshold lowers as the rotation speed of the drive shaft increases in a range where the rotation speed of the drive shaft is larger than the prescribed value.

The acquisition unit may acquire the estimated amount by calculating the estimated amount based on the rotation speed of the drive shaft and the rotation speed of the fan in consideration of the moment of inertia of the fan and the housing.

The acquisition unit may acquire the estimated amount by calculating the estimated amount based on an engagement ratio obtained by dividing the rotation speed of the fan by the rotation speed of the drive shaft.

The fluid amount parameter may be the estimated amount.

The fluid amount parameter may be an engagement ratio obtained by dividing the rotation speed of the fan by the rotation speed of the drive shaft.

The present embodiment can provide a controller of a fan coupling device in which deterioration of responsiveness is restrained.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of Vehicle

Figure 1:
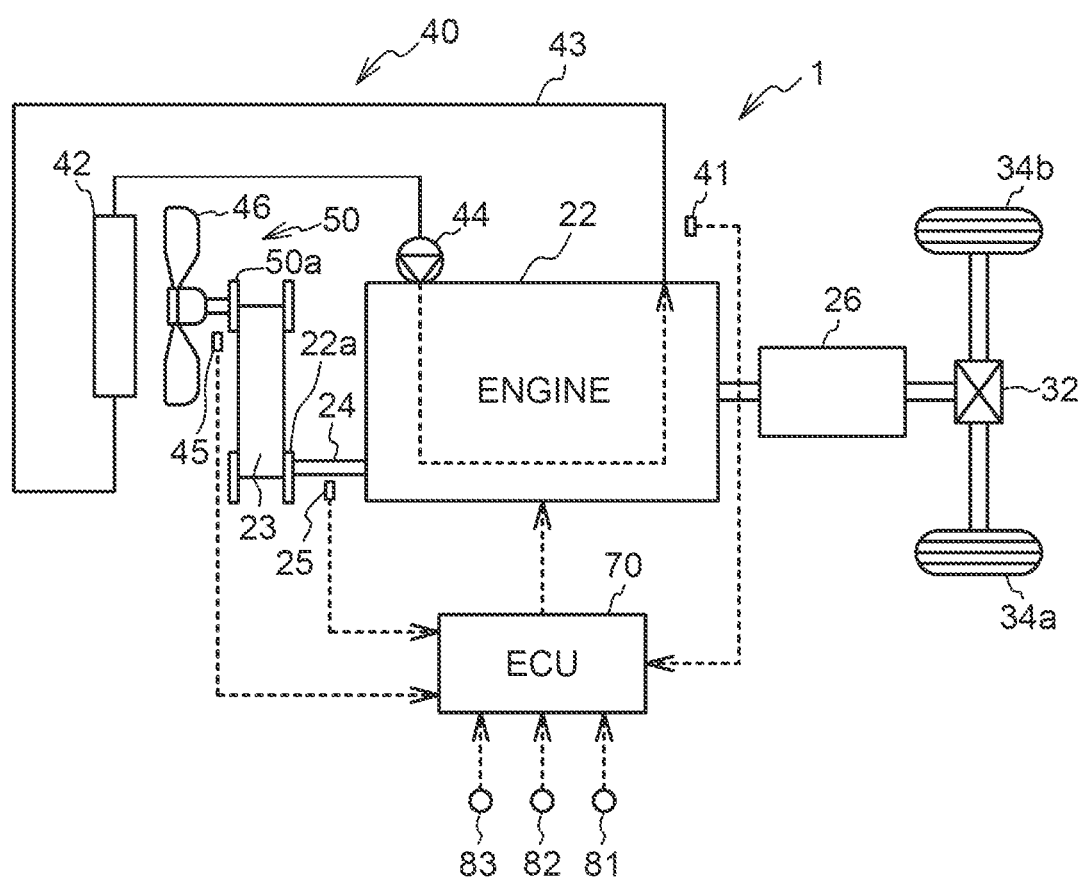
FIG. 1 shows an overall configuration of a vehicle in a present embodiment.

FIG. 1 shows an overall configuration of a vehicle 1 in the present embodiment. The vehicle I in the embodiment includes an engine 22, an automatic transmission 26 that changes the speed of motive power output to a crankshaft 24 from the engine 22 and transmits the motive power to wheels 34a, 34b through a differential gear 32, a cooling device 40 that cools the engine 22 using coolant with the motive power from the engine 22, and an electronic control unit (ECU) 70 that controls the entire vehicle. The engine 22 may be a gasoline engine or may be a diesel engine. The vehicle 1 may also be a hybrid vehicle.

The cooling device 40 includes a radiator 42 that performs heat exchange between the coolant of the engine 22 and ambient air, a water pump 44 driven with the motive power of the engine 22 to circulate the coolant in a circulation path 43 which connects the radiator 42 and the engine 22, and a fan 46 rotationally driven with the motive power input from the engine 22 through a fan coupling device 50.

With a belt 23 placed over a pulley 50a attached to a later-described drive shaft 51 and a pulley 22a of the engine 22, the fan coupling device 50 transmits the motive power input from the engine 22 to the fan 46 using later-described working fluid.

The ECU 70 includes a central processing unit (CPU), a random access memory (RAM), and a read only memory (ROM). The ECU 70 controls the engine 22 by executing programs stored in the RAM or ROM. The ECU 70 is also electrically connected to an ignition switch 81, a crank angle sensor 25 that detects the rotation speed of the crankshaft 24 of the engine 22, a rotation speed sensor 45 that detects the rotation speed of the fan 46, an accelerator pedal position sensor 82 that detects an accelerator operation amount, a vehicle speed sensor 83 that detects a vehicle speed, and a coolant temperature sensor 41 that detects an outlet temperature of the coolant. As described later in detail, the ECU 70 controls the later-described regulation mechanism 60 with use of an acquisition unit and a control unit that are functionally implemented by the CPU, the RAM, and the ROM.

Configuration of Fan Coupling Device

Figure 2:
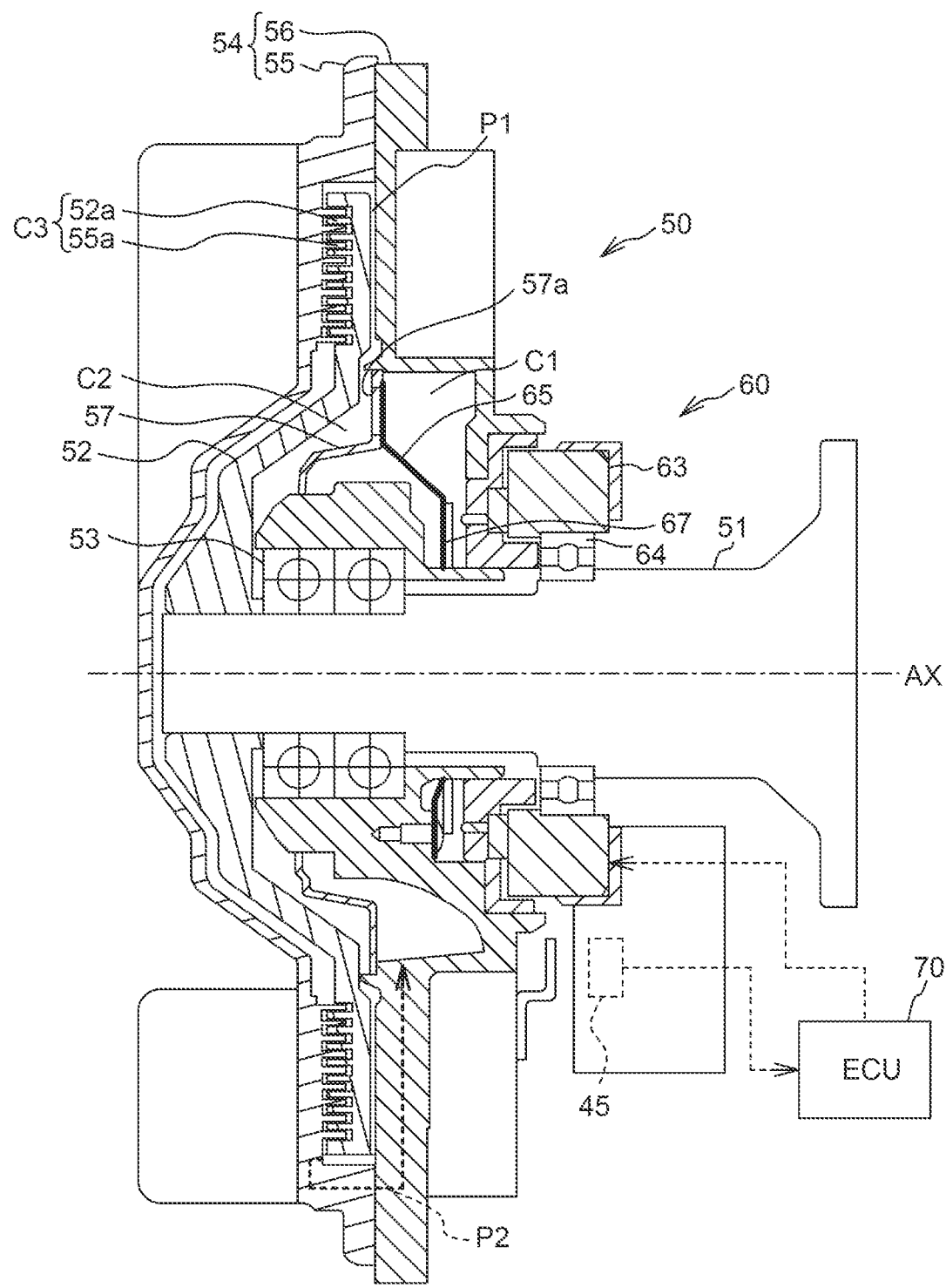
FIG. 2 is a sectional view of a fan coupling device.

FIG. 2 is a sectional view of the fan coupling device 50. The fan coupling device 50 includes the drive shaft 51, a rotor 52, a housing 54, a divider 57, and a regulation mechanism 60. In the housing 54, silicone oil with a high viscosity is enclosed as working fluid, for example. Henceforth, the working fluid is referred to as hydraulic oil.

Between the drive shaft 51 and the housing 54, two bearings 53 are provided. Fixed to a distal-end portion of the drive shaft 51 is the rotor 52 having an approximately disc-shape. Fixed to a base end portion of the drive shaft 51 is the pulley 50a shown in FIG. 1. The drive shaft 51 and the rotor 52 rotate when the rotational motive power of the crankshaft 24 shown in FIG. 1 is transmitted through the belt 23 and the pulley 50a. In FIG. 2, a center axis line AX of the drive shaft 51 is illustrated.

The housing 54 includes a cover portion 55 and a body portion 56 which are fixed to each other. The cover portion 55 is located on the distal-end side of the drive shaft 51, and the body portion 56 is located closer to the proximal-end side of the drive shaft 51 than the cover portion 55. The drive shaft 51 is held so as to be rotatable relative to the body portion 56 through the bearing 53. The fan 46 not shown in FIG. 2 is provided in an outer peripheral portion of the housing 54. On a back surface side of the body portion 56, the rotation speed sensor 45 is provided to detect the rotation speed of the body portion 56 which rotates integrally with the fan 46.

The inside of the housing 54 is divided by the divider 57 into a storage chamber C1 and a working chamber C2. The storage chamber C1 is provided on the side of the body portion 56. The working chamber C2 is provided on the side of the cover portion 55. The divider 57 has a communicating port 57a provided so as to communicate with the storage chamber C1 and the working chamber C2.

The rotor 52 is housed in the working chamber C2. The rotor 52 has a plurality of ribs 52a provided in a concentric circular shape. Similarly, on the inner side of the cover portion 55, a plurality of ribs 55a is provided in a concentric circular shape. When these ribs 52a and 55a gear each other, a labyrinth chamber C3 which is space like a labyrinth is formed.

Between the back surface side of the rotor 52 and the inner side of the body portion 56, a supply passage P1 is formed so as to connect the central side and the outer peripheral side of the rotor 52. On the opposite side of the central portion of the rotor 52 from the supply passage P1 in FIG. 2, a collection passage P2 is formed so as to extend from the inside of the cover portion 55 to the storage chamber C1 through the cover portion 55 and the body portion 56. The hydraulic oil discharged from the labyrinth chamber C3 flows into the storage chamber C1 through the collection passage P2.

The regulation mechanism 60 regulates the oil amount in the labyrinth chamber C3. The regulation mechanism 60 includes an electromagnet 63, a valve body 65, and an armature 67. The valve body 65 is a plate-shaped member made of an elastically deformable metal. The valve body 65 is fixed at its base end portion to the body portion 56 with a screw. The armature 67 is fixed to the surface of the valve body 65 on the side of the electromagnet 63. The armature 67 is biased with a spring, which is not shown, toward the divider 57. Thus, the distal-end portion of the valve body 65 closes the communicating port 57a.

The ECU 70 controls energizing and non-energizing of the electromagnet 63. When the electromagnet 63 is in a non-energized state, the distal-end portion of the valve body 65 closes the communicating port 57a as described above. When the electromagnet 63 is energized, the armature 67 is magnetically attracted toward the electromagnet 63, and the distal-end portion of the valve body 65 is elastically deformed so as to be separated from the communicating port 57a against the biasing force of the spring described above. Here, the ECU 70 controls energizing and non-energizing of the electromagnet 63 through pulse width modulation (PWM) control. More specifically, the ECU 70 can regulate the opening degree of the communicating port 57a by regulating a duty ratio of a drive voltage of the electromagnet 63.

The electromagnet 63, which is formed in an annular shape, is provided in the state of being inserted into the drive shaft 51. The electromagnet 63 is fixed to the vehicle mounted with an internal combustion engine, the internal combustion engine itself, or other auxiliary machines. Between the drive shaft 51 and the electromagnet 63, a bearing 64 is disposed. Since the drive shaft 51 and the electromagnet 63 can rotate in a relative manner, the drive shaft 51 can rotate while the electromagnet 63 is fixed to the vehicle or the like.

When the electromagnet 63 is energized and the valve body 65 opens the communicating port 57a, the hydraulic oil is supplied to the working chamber C2 from the storage chamber C1, and is supplied to the labyrinth chamber C3 through the supply passage P1. Due to viscous resistance of the hydraulic oil in the labyrinth chamber C3, the rotation torque of the rotor 52 is transmitted to the housing 54, and thereby the housing 54 and the fan 46 rotate. As a consequence, the speed of cooling air sucked into the radiator 42 increases even with the vehicle rotation speed unchanged, so that the amount of heat radiation from the radiator 42 increases. When the amount of heat radiation from the radiator 42 increases, the temperature of coolant changes to be lower. The hydraulic oil discharged from the labyrinth chamber C3 is collected into the storage chamber C1 through the collection passage P2. In the state where the communicating port 57a is open, the hydraulic oil collected into the storage chamber C1 is again supplied to the working chamber C2.

When the electromagnet 63 is put in the non-energized state and the valve body 65 closes the communicating port 57a, the hydraulic oil discharged from the labyrinth chamber C3 is collected into the storage chamber C1, and supply of the hydraulic oil to the working chamber C2 is stopped. When the hydraulic oil is completely discharged from the labyrinth chamber C3, the rotation torque of the rotor 52 is not transmitted to the housing 54, and only the rotor 52 rotates. This means that the fan 46 stops its rotation.

By regulating the opening degree of the communicating port 57a through PWM control of the electromagnet 63 by the ECU 70, the oil amount in the labyrinth chamber C3 can be regulated, and, thus, the rotation speed of the housing 54 and the fan 46 can be regulated. The engagement ratio can be calculated by dividing the rotation speed of the housing 54 and the fan 46 by the rotation speed of the rotor 52. Moreover, in consideration of the temperature of the coolant detected by the coolant temperature sensor 41, the ECU 70 controls the opening degree of the communicating port 57a such that the fan 46 rotates at desired rotation speed.

Collection Speed of Hydraulic Oil

Figure 3:
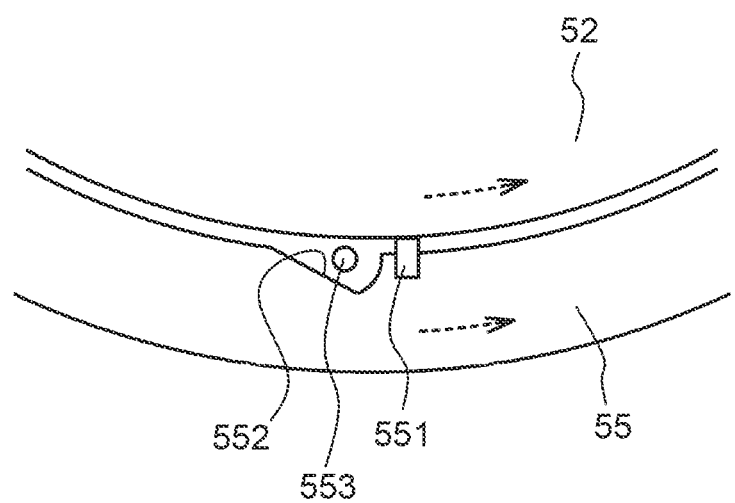
FIG. 3 shows some parts of a rotor and a cover portion viewed from the back surface side in the state where a body portion is removed from the cover portion.

Description is now given of the collection speed of hydraulic oil. FIG. 3 shows some parts of the rotor 52 and the cover portion 55 viewed from the back surface side with the body portion 56 being removed from the cover portion 55. On the inner peripheral surface of the cover portion 55 facing the outer peripheral surface of the rotor 52, a protruding portion 551 protruding toward the outer peripheral surface of the rotor 52 is provided. On the opposite side of the protruding portion 551 in a rotation direction of the rotor 52, a recess portion 552 is provided facing the outer peripheral surface of the rotor 52 so as to be apart from the outer peripheral surface. In the recess portion 552, a collection port 553 corresponding to one end of the collection passage P2 for collecting the hydraulic oil is formed. The collection port 553 communicates with the storage chamber C1 through the collection passage P2 formed along the cover portion 55 and the body portion 56. In FIG. 3, the rotation direction of the rotor 52 is counterclockwise. With the rotation, the cover portion 55 also rotates counterclockwise. Here, the rotation speed of the cover portion 55 is slower than the rotation speed of the rotor 52. Accordingly, the hydraulic oil discharged from the labyrinth chamber C3 flows between the outer peripheral surface of the rotor 52 and the inner peripheral surface of the cover portion 55, and dammed by the protruding portion 551 due to a rotation speed difference between the rotor 52 and the cover portion 55 so as to be promoted to flow into the collection port 553. Thus, the hydraulic oil is collected into the storage chamber C1.

Here, when the amount of oil in the labyrinth chamber C3 is large, i.e., when an engagement ratio is high, the rotation speed difference between the rotor 52 and the cover portion 55 is small. Accordingly, as described before, the speed of collecting the hydraulic oil into the storage chamber C1 is lowered. Therefore, in the case where, for example, the state of a high engagement ratio is shifted to the state of a low engagement ratio, the responsiveness may deteriorate due to the lower collection speed of the hydraulic oil, even with a valve opening rate of the valve body 65 being lowered. In the case where the state of a high engagement ratio is shifted to the state of a still higher engagement ratio, collection of the hydraulic oil may not be promoted even with the valve opening rate of the valve body 65 being increased. Hence, it may take time to increase the supply amount of the hydraulic oil to the labyrinth chamber C3, and deterioration of the responsiveness may occur in this case. It is considered that such deterioration of the responsiveness in the case of the high engagement ratio may also occur when the protruding portion 551 is not provided. This is considered to be because, when the rotation speed difference between the rotor 52 and the cover portion 55 is small, the hydraulic oil between the outer peripheral surface of the rotor 52 and the inner peripheral surface of the cover portion 55 co-rotate with the rotor 52 and the cover portion 55 even in the configuration without the protruding portion 551, and this may cause deteriorated collection speed of the hydraulic oil. Accordingly, the ECU 70 controls the fan coupling device 50 as follows.

Control Method of Fan Coupling Device

Figure 4:
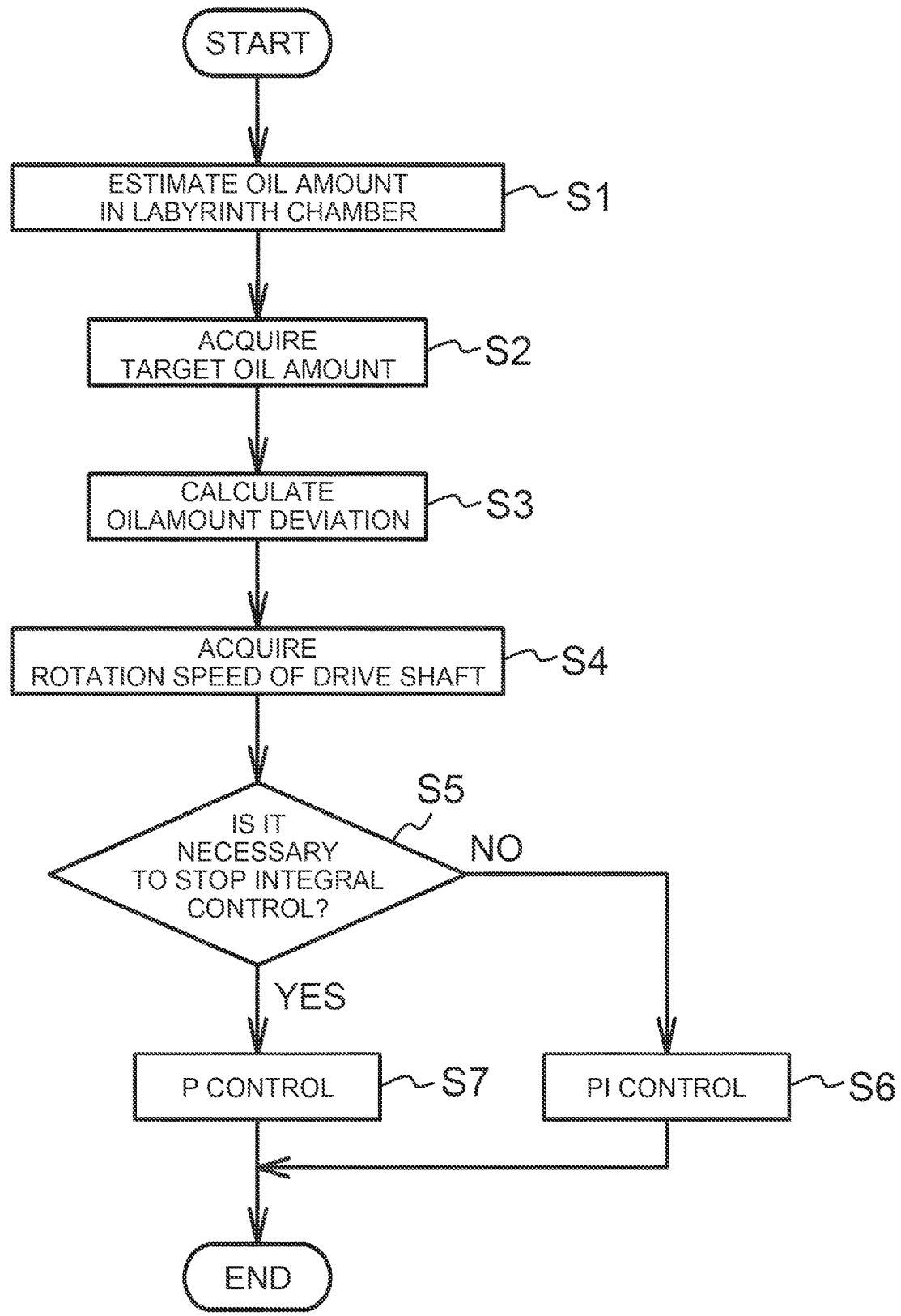
FIG. 4 is a flowchart showing an example of a control method of a fan coupling device executed by an ECU.

FIG. 4 is a flowchart showing an example of a control method of the fan coupling device 50 executed by the ECU 70. The control is repeatedly executed while the engine 22 is driven. The ECU 70 estimates the oil amount in the labyrinth chamber C3 (step S1). The estimated oil amount is an example of the fluid parameter correlated with the estimated amount of hydraulic oil in the labyrinth chamber C3. A specific estimation method will be described later. Next, the ECU 70 acquires a target oil amount that is a target value of the amount of oil in the labyrinth chamber C3 (step S2). The target oil amount is calculated from a target engagement ratio. The target engagement ratio is set in consideration of the rotation speed of the crankshaft 24, the vehicle rotation speed, the temperature of coolant, or other parameters such as a set temperature of an air-conditioner of the vehicle 1. Next, the ECU 70 calculates an oil amount deviation obtained by subtracting the target oil amount [$m^3$] from the estimated oil amount [$m^3$] (step S3). Steps S1 to S3 are examples of the processes executed by the acquisition unit.

Next, the ECU 70 acquires the rotation speed of the drive shaft 51 (step S4). Specifically, the ECU 70 acquires the rotation speed [rpm] of the drive shaft 51 based on the rotation speed of the crankshaft 24 acquired by the crank angle sensor 25 and a diameter ratio between the pulley 22a and the pulley 50a.

Next, the ECU 70 determines based on the oil amount (estimated oil amount) estimated in step S1 and the rotation speed of the drive shaft 51 acquired in step S4 whether or not it is necessary to stop integral control (step S5). The details about this determination will be described later. When No in step S5, the ECU 70 controls the electromagnet 63 of the regulation mechanism 60 through PI control performed on the oil amount deviation calculated in step S3 without stopping the integral control (step S6). When Yes in step S5, the ECU 70 stops integral control, and controls the electromagnet 63 through P control performed on the oil amount deviation (step S7). Steps S5 to S7 are examples of the processes executed by the control unit.

Figure 5:
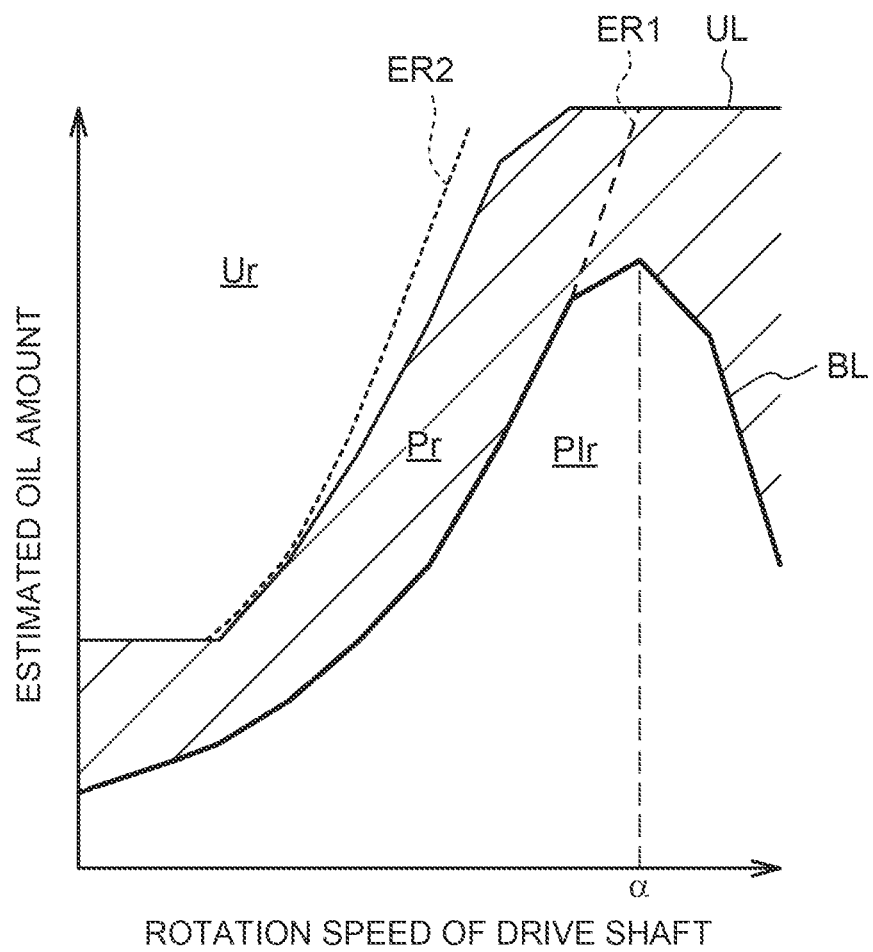
FIG. 5 is an example of a map showing regions where PI control or P control is executed in accordance with the rotation speed of the drive shaft and an estimated oil amount.

FIG. 5 is an example of a map showing regions where PI control or P control is executed in accordance with the rotation speed of the drive shaft 51 and the estimated oil amount. In the map, a vertical axis represents the estimated oil amount, and a horizontal axis represents the rotation speed of the drive shaft 51. The map is prestored in the ROM of the ECU 70. In a region PIr, PI control is executed when an operating point defined by the rotation speed of the drive shaft 51 and the estimated oil amount belongs to the region. In a region Pr, integral control is stopped and P control is executed when the operating point belongs to the region. A boundary line BL represents a boundary between the region PIr and the region Pr. The region Pr is defined to be larger in estimated oil amount than the region PIr. Therefore, the boundary line BL corresponds to a threshold which separates the region Pr and the region PIr. An upper limit line UL represents an upper limit that the estimated oil amount can take with respect to the rotation speed of the drive shaft 51 due to the target oil amount being limited. Therefore, Ur represents a region that the estimated oil amount is not assumed to take with respect to the rotation speed of the drive shaft 51. FIG. 5 also shows engagement ratio lines ER1, ER2 representing engagement ratios. The engagement ratio line ER1 is smaller in engagement ratio than the engagement ratio line ER2.

The boundary line BL indicates that the estimated oil amount increases as the rotation speed of the drive shaft 51 increases in the range where the rotation speed of the drive shaft 51 is equal to or less than a prescribed value α. The boundary line BL also indicates that the estimated oil amount reduces as the rotation speed of the drive shaft 51 increases in the range where the rotation speed of the drive shaft 51 is larger than the prescribed value α. The prescribed value α is set on a high-speed side from the center of the range of the rotation speed that the drive shaft 51 can take.

Thus, when the estimated oil amount is relatively large with respect to the rotation speed of the drive shaft 51, an operating point based on the rotation speed of the drive shaft 51 and the estimated oil amount belongs to the region Pr, so that P control is executed. Thus, deterioration of the responsiveness described above is restrained. When the estimated oil amount is relatively small with respect to the rotation speed of the drive shaft 51, deterioration of responsiveness does not easily occur. Therefore, PI control is executed. In the range where the rotation speed of the drive shaft 51 is equal to or less than the prescribed value α, the boundary line BL mostly overlaps with the engagement ratio line ER1. The engagement ratio line ER1 is, for example, in the range of 0.65 to 0.85. Thus, P control is executed, when it is estimated that the oil amount in the labyrinth chamber C3 is large enough to attain a relatively high engagement ratio.

In the range where the rotation speed of the drive shaft 51 is equal to or less than the prescribed value α, the region Pr expands as the rotation speed of the drive shaft 51 increases. When the rotation speed of the drive shaft 51 becomes high, the temperature of the hydraulic oil increases, and the viscosity of the hydraulic oil lowers. Moreover, air bubble ratio of the hydraulic oil in the labyrinth chamber C3 increases, which hinders sufficient transmission of the rotation torque of the rotor 52 to the housing 54. This causes deterioration of responsiveness. Accordingly, in order to restrain such deterioration of the responsiveness, the region Pr is secured to execute P control.

Calculation Method of Estimated Oil Amount

Description is now given of a calculation method of the estimated oil amount described above by using numerical expressions.

$$T_{fric} = L \times \frac{\mu}{h} UA \quad (1)$$

$$= L \times \frac{\mu}{h} \{L(\omega_{in} - \omega_{fan})\}A$$

$$= \frac{\mu}{h} \omega_{in} - \omega_{fan} \cdot f(Q_{oil})$$

A transmission torque $T_{fric}$ [N·m] represents a transmission torque transmitted to the housing 54 and the fan 46 from the drive shaft 51 by the fan coupling device 50. An immersed surface rotation radius L [m] represents the rotation radius of an immersed surface which is a distance of a region of the labyrinth chamber C3 immersed with hydraulic oil from the center axis line AX. A coefficient of viscosity μ [Pa·s] represents the coefficient of viscosity of hydraulic oil. The coefficient of viscosity μ takes a value predetermined in accordance with the type of hydraulic oil. A gap representative value h[m] represents a representative value of a gap of the labyrinth chamber C3, i.e., a gap between the rib 52a and the rib 55a. The gap representative value takes a predetermined value. A peripheral rotation speed difference U [m/s] represents a difference between a peripheral rotation speed of the outer periphery of the rotor 52 and a peripheral rotation speed of the inner periphery of the housing 54. An immersion area A [m²] represents the area of a region of the labyrinth chamber C3 immersed with hydraulic oil. An angular rotation speed $\omega_{in}$ [rad/s] represents the angular rotation speed of the drive shaft 51. An angular rotation speed $\omega_{fan}$ [rad/s] represents the angular rotation speed of the fan 46. A term $f(Q_{oil})$ represents the product [m⁴] of the immersion area A and the square of the immersed surface rotation radius L. An oil amount $Q_{oil}$ [m³] represents the amount of hydraulic oil in the labyrinth chamber C3.

The expression (1) can be deformed into an expression (2) and expression (3).

$$f(Q_{oil}) = \frac{h}{\mu} \cdot \frac{T_{fric}}{\omega_{in} - \omega_{fan}} \quad (2)$$

$$Q_{oil} = f^{-1}\left(\frac{T_{fric}}{\omega_{in} - \omega_{fan}} \cdot \frac{h}{\mu}\right) \quad (3)$$

$$\equiv g\left(\frac{T_{fric}}{\omega_{in} - \omega_{fan}}\right)$$

In the expression (3), g represents a function. A term $g\{T_{fric}/(\omega_{in}-\omega_{fan})\}$ represents the oil amount [m³] with which the transmission torque $T_{fric}$ can be obtained at $(\omega_{in}-\omega_{fan})$.

Following expressions are also established.

[Expression 4]

$$T_{fric} = T_{drag} T_{inert} \quad (4)$$

$$T_{drag} = k_{drag} \omega_{fan}^2 \quad (5)$$

$$T_{inert} = I_{fan} \dot{\omega}_{fan} \quad (6)$$

A drag load torque $T_{drag}$ [N·m] represents the drag load torque acting on the housing 54 and the fan 46. An inertial load torque $T_{inert}$ [N·m] represents the inertial load torque acting on the housing 54 and the fan 46. A drag calculation coefficient $k_{drag}$ [(N·m)/(rad/s)$^2$] is a predetermined value. An inertia moment $I_{fan}$ [kg·m$^2$] represents the inertia moment of the housing 54 and the fan 46 which rotate integrally. An angular acceleration $\omega_{fan}'$ [rad/s$^2$] represents the angular acceleration of the fan 46. According to the above, the expression (3) can be expressed as below:

$$\therefore Q_{oil} = g\left(\frac{k_{drag}\omega_{fan}^2 + I_{fan}\omega_{fan}'}{\omega_{in} - \omega_{fan}}\right) \quad (7)$$

Since the angular speed $\omega_{in}$ is the angular speed of the drive shaft 51, it can be calculated based on the rotation speed of the crankshaft 24 detected by the crank angle sensor 25 and a ratio between the diameters of the pulleys 22a, 50a. The angular speed $\omega_{fan}$ is the angular speed of the fan 46, and the angular acceleration $\omega_{fan}'$ can be obtained by time-differentiating the angular speed of the fan 46. Accordingly, the angular acceleration $\omega_{fan}'$ can be calculated from the rotation speed of the fan 46 detected by the speed sensor 45. The drag calculation coefficient $k_{drag}$ is stored in advance in the ROM of the ECU 70. Similarly, the function g is stored in advance in the ROM of the ECU 70 as a map. However, the function g may also be stored as an operation expression.

As shown in the expression (3), the gap representative value h and the immersed surface rotation radius L are reflected on the function g. As shown in the expression (7), the oil amount $Q_{oil}$ is calculated in consideration of the inertial load torque $T_{inert}$ and the drag load torque $T_{drag}$. Accordingly, the oil amount in the labyrinth chamber C3 can accurately be estimated. Therefore, in the case of performing various control using the estimated value, the control can accurately be executed.

In the expression (7), the angular acceleration $\omega_{fan}'$ may be smoothed, and then the oil amount $Q_{oil}$ may be calculated. When the inertia moment $I_{fan}$ of the housing 54 and the fan 46 is extremely small, and therefore the inertial load torque $T_{inert}$ is ignorable, the oil amount $Q_{oil}$ may be calculated by setting the inertia moment $I_{fan}$ to zero in the expression (7).

Figure 6:
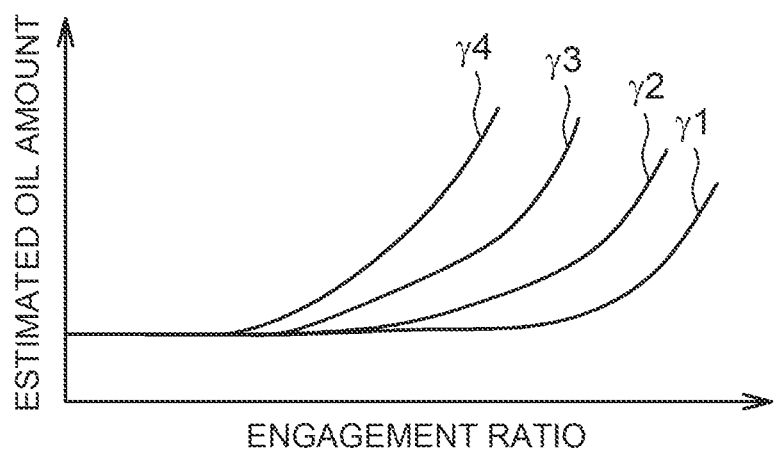
FIG. 6 is an example of a map that defines the relationship between an engagement ratio and the estimated oil amount.

The estimated oil amount may also be calculated as follows. FIG. 6 is an example of a map that defines the relationship between the engagement ratio and the estimated oil amount. The map is defined based on an experimental result or the like, and is stored in the ROM of the ECU 70. The engagement ratio can be calculated by dividing the rotation speed of the rotor 52 by the rotation speed of the housing 54 and the fan 46 as described before. The rotation speed of the rotor 52 is the rotation speed of the drive shaft 51. The rotation speed of the drive shaft 51 can be calculated based on the rotation speed of the crankshaft 24 detected by the crank angle sensor 25 and on the ratio between the diameters of the pulleys 22a, 50a. The rotation speeds γ1 to γ4 of the drive shaft 51 are larger in this order. Thus, the estimated oil amount may be calculated based on the engagement ratio and the rotation speed of the drive shaft 51 with reference to the map of FIG. 6.

First Modification of Control Method

Figure 7:
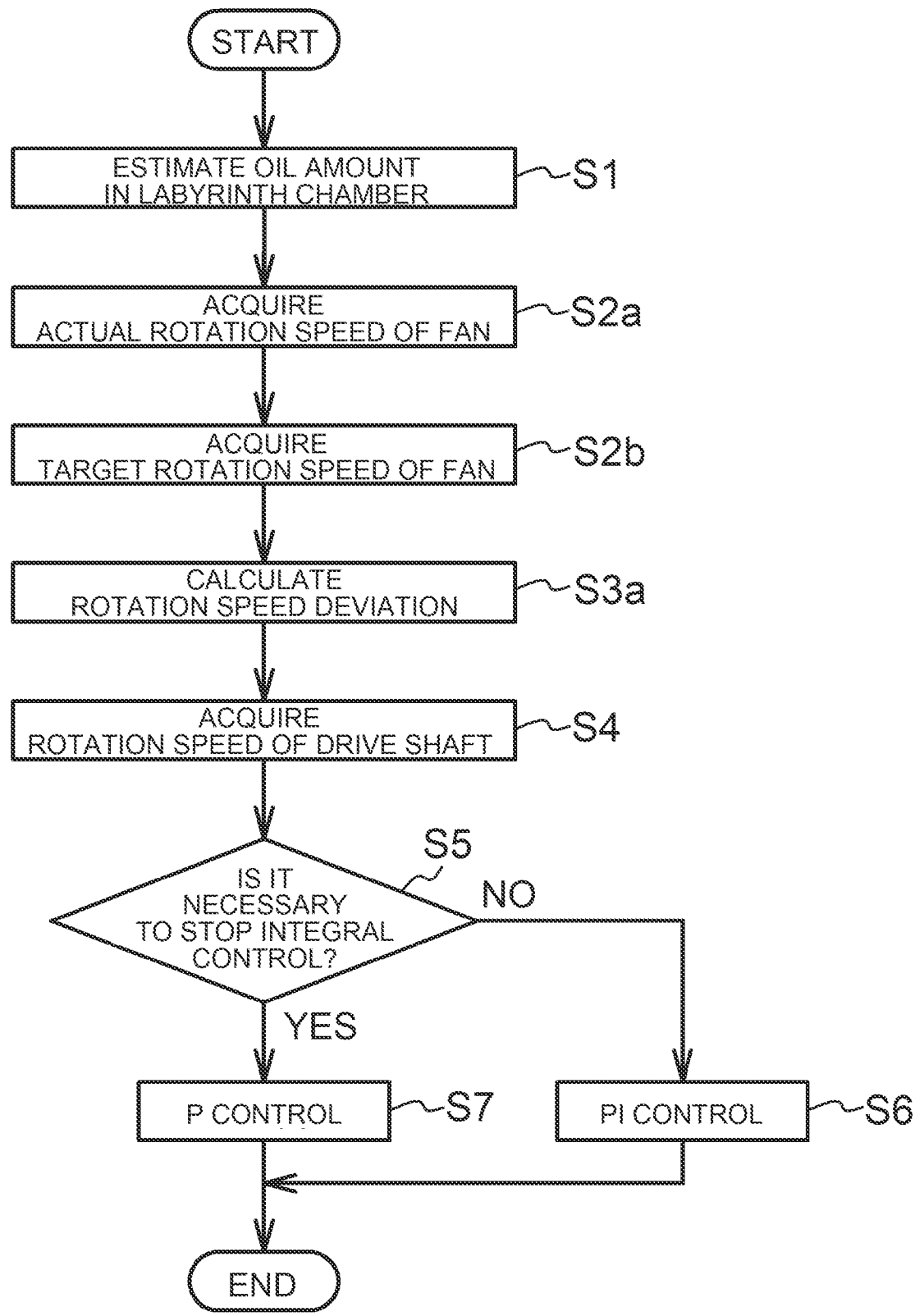
FIG. 7 is a flowchart showing a first modification of the control method of a fan coupling device executed by the ECU.

FIG. 7 is a flowchart showing a first modification of a control method of the fan coupling device 50 executed by the ECU 70. After execution of the process of step S1, the ECU 70 acquires the actual rotation speed [rpm] of the fan 46 (step S2a), and acquires the target rotation speed [rpm] of the fan 46 (step S2b). Next, the ECU 70 calculates a rotation speed deviation that is a value obtained by subtracting the target rotation speed of the fan 46 from the actual rotation speed (step S3a). Next, the ECU 70 executes the processes subsequent to step S4. In short, in the first modification, feedback control is performed on the rotation speed deviation to control the electromagnet 63. In this case, PI control or P control is also executed based on the estimated oil amount calculated in step SI and the rotation speed of the drive shaft 51 acquired in step S4. Steps S2a, S2b, and S3a are examples of the processes executed by the acquisition unit. To control the electromagnet 63, feedback control may be performed on an angular speed deviation that is a value obtained by subtracting a target angular speed [rad] of the fan 46 from an actual angular speed [rad] of the fan 46 instead of the above-described rotation speed deviation. The target rotation speed and the target angle speed are calculated from the target engagement ratio as in the case of the target oil amount described before. The above-described rotation speed deviation and angular speed deviation are examples of the deviation parameter.

Second Modification of Control Method

Figure 8:
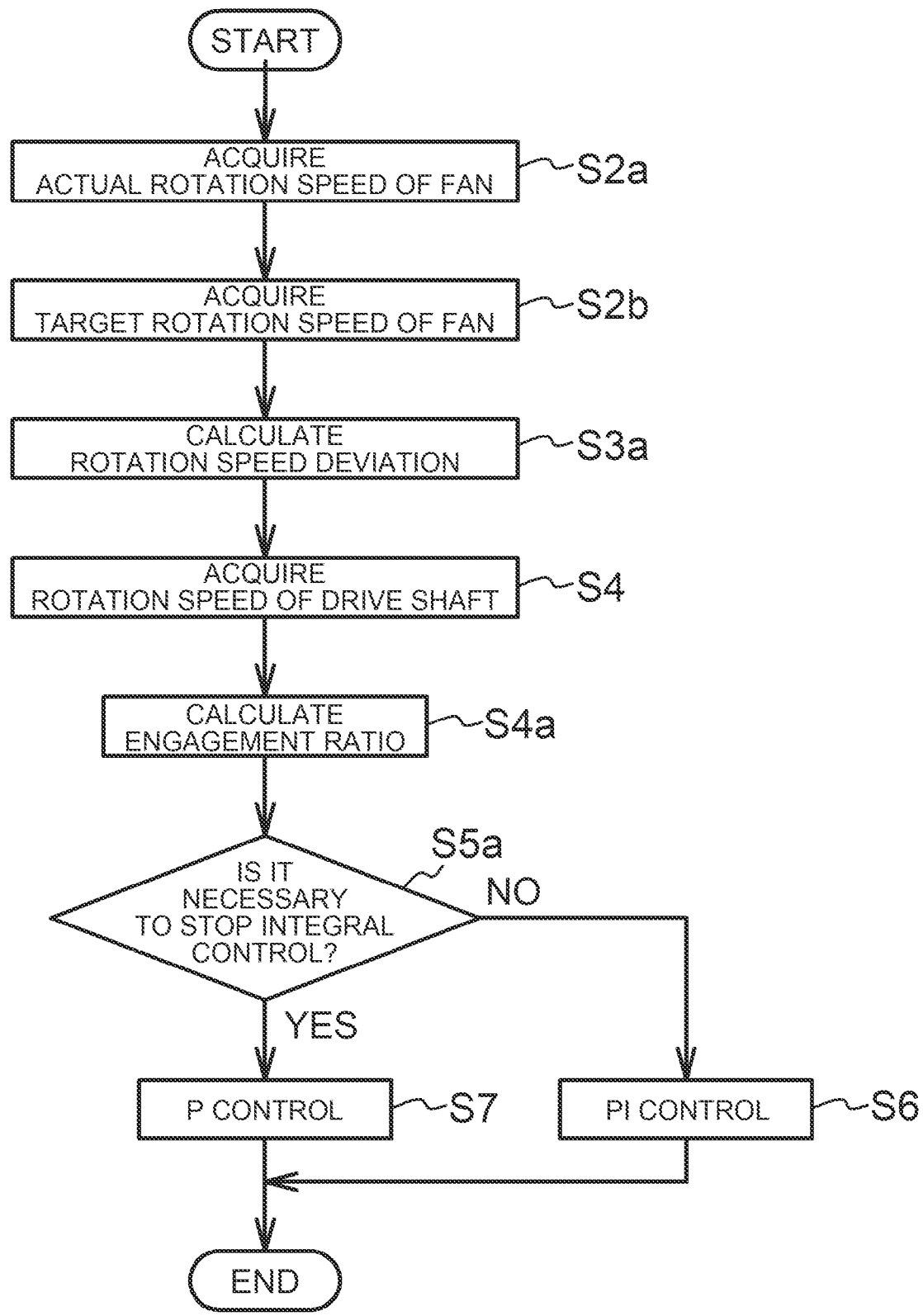
FIG. 8 is a flowchart showing a second modification of the control method of a fan coupling device executed by the ECU.
Figure 9:
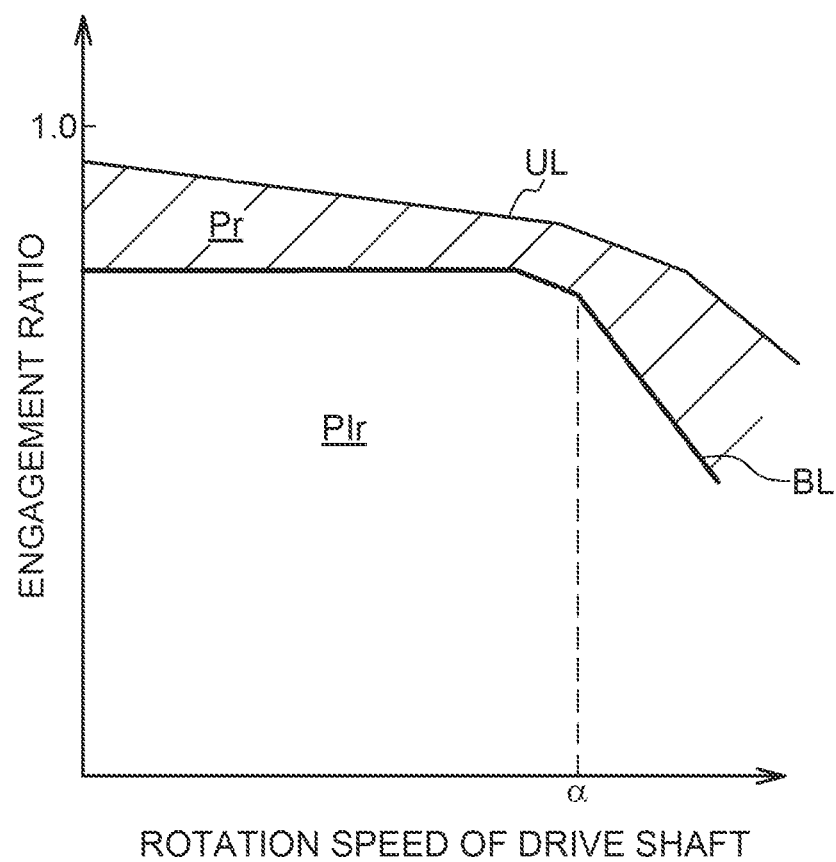
FIG. 9 is an example of a map that defines the relationship between the rotation speed of the drive shaft and the engagement ratio.

FIG. 8 is a flowchart showing a second modification of a control method of the fan coupling device 50 executed by the ECU 70. In the second modification, calculation of the estimated oil amount in step S1 described above is not executed. As in the case of the first modification, after execution of steps S2a, S2b, S3a, and S4, the ECU 70 calculates an engagement ratio (step S4a). Step S4a is an example of the process executed by the acquisition unit. Next, based on the engagement ratio and the rotation speed of the drive shaft 51, the ECU 70 determines whether or not it is necessary to stop integral control (step S5a). When executing the process of step S5a, a map shown in FIG. 9 is referred. Step S5a is an example of the process executed by the control unit. FIG. 9 is an example of a map that defines the relationship between the rotation speed of the drive shaft 51 and the engagement ratio. When an operating point defined by the rotation speed of the drive shaft 51 and the engagement ratio belongs to the region PIr, No is determined in step S5a, and PI control is executed (step S6). When the operating point belongs to the region Pr, Yes is determined in step S5a, and P control is executed (step S7).

As shown in FIG. 9, the boundary line BL has a constant engagement ratio in the range where the rotation speed of the drive shaft 51 is equal to or less than the prescribed value α. In the range where the rotation speed of the drive shaft 51 is larger than the prescribed value α, the boundary line BL indicates that the engagement ratio gradually lowers as the rotation speed of the drive shaft 51 increase.

Here, the case where the engagement ratio is large means that a rotation speed difference between the rotor 52 and the fan 46 is small. In this case, the oil amount in the labyrinth chamber C3 is large. The case where the engagement ratio is small means that the rotation speed difference between the rotor 52 and the fan 46 is large. In this case, the oil amount in the labyrinth chamber C3 is small. Thus, the engagement ratio is correlated with the oil amount in the labyrinth chamber C3. Hence, the engagement ratio is an example of the fluid amount parameter corresponding to the estimated oil amount in the labyrinth chamber C3. Therefore, as shown in FIG. 9, when P control is executed while the engagement ratio is high, deterioration of responsiveness can be restrained.

Others

In the present embodiment described above, when the estimated oil amount is equal to or greater than the threshold, P control is executed by stopping integral control, while the electromagnet 63 is controlled by feedback control on the deviation between the estimated oil amount and the target oil amount in the labyrinth chamber C3. When the engagement ratio is larger than the threshold, P control may be executed, while the electromagnet 63 is controlled by feedback control on the deviation between the estimated oil amount and the target oil amount.

The embodiment has been described based on the example in which PI control or P control is executed. However, without being limited to these examples, PID control may be executed instead of PI control, and PD control may be executed instead of P control. In unison with the feedback control, feedforward control may also be carried out.

Although the embodiment of the present disclosure has been described in detail, the applicable embodiment is not limited to such specific embodiments. Various modifications and changes may be made without departing from the scope of the present disclosure.

What is claimed is:

1. A controller of a fan coupling device, the fan coupling device including a drive shaft that is rotationally driven, a rotor coupled to the drive shaft, a housing configured to house the rotor, the housing being supported so as to be rotatable relative to the rotor, a fan fixed to the housing, a labyrinth chamber formed between the housing and the rotor in the housing and configured to transmit rotational motive power of the rotor to the housing through working fluid, and a regulation mechanism configured to regulate an amount of the working fluid in the labyrinth chamber, the controller comprising:
    an acquisition unit configured to acquire a deviation between an estimated amount and a target amount of the working fluid in the labyrinth chamber, and a fluid amount parameter corresponding to the estimated amount; and
    a control unit configured to execute feedback control including at least integral control of the deviation so as to control the regulation mechanism, wherein
    when the fluid amount parameter is equal to or greater than a threshold, the control unit executes the feedback control in a state where the integral control is stopped.

2. The controller according to claim 1, wherein the control unit is set such that the threshold increases as a rotation speed of the drive shaft increases in a range where a rotation speed of the drive shaft is equal to or less than a prescribed value.

3. The controller according to claim 2, wherein the control unit is set such that the threshold lowers as the rotation speed of the drive shaft increases in a range where the rotation speed of the drive shaft is larger than the prescribed value.

4. The controller according to claim 1, wherein the acquisition unit acquires the estimated amount by calculating the estimated amount based on a rotation speed of a drive shaft and the rotation speed of the fan in consideration of moment of inertia of the fan and the housing.

5. The controller according to claim 1, wherein the acquisition unit acquires the estimated amount by calculating the estimated amount based on an engagement ratio obtained by dividing a rotation speed of the fan by a rotation speed of the drive shaft.

6. The controller according to claim 1, wherein the fluid amount parameter is the estimated amount.

7. The controller according to claim 1, wherein the fluid amount parameter is an engagement ratio obtained by dividing a rotation speed of the fan by a rotation speed of the drive shaft.

8. A controller of a fan coupling device, the fan coupling device including a drive shaft that is rotationally driven, a rotor coupled to the drive shaft, a housing configured to house the rotor, the housing being supported so as to be rotatable relative to the rotor, a fan fixed to the housing, a labyrinth chamber formed between the housing and the rotor in the housing and configured to transmit rotational motive power of the rotor to the housing through working fluid, and a regulation mechanism configured to regulate an amount of the working fluid in the labyrinth chamber, the controller comprising:
    an acquisition unit configured to acquire a deviation parameter corresponding to a deviation between an actual rotation speed and a target rotation speed of the fan, and a fluid amount parameter corresponding to an estimated amount of the working fluid in the labyrinth chamber; and
    a control unit configured to execute feedback control including integral control of the deviation parameter so as to control the regulation mechanism, wherein
    when the fluid amount parameter is equal to or greater than a threshold, the control unit executes the feedback control in a state where the integral control is stopped.

* * * * *